United States Patent Office 3,220,640
Patented Nov. 30, 1965

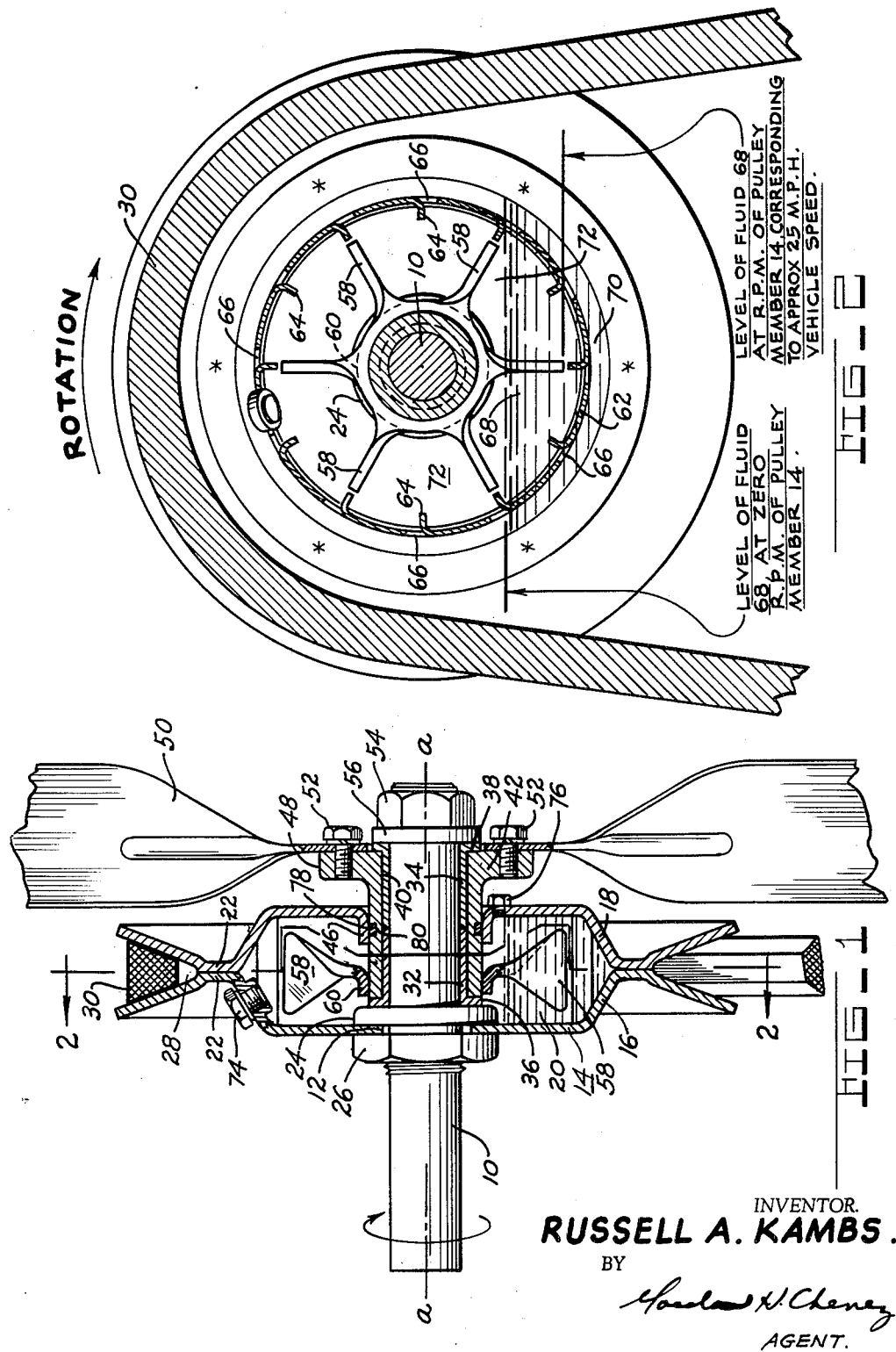

3,220,640
FLUID COUPLING FOR ENGINE DRIVEN FAN
Russell A. Kambs, South Bend, Ind., assignor to The Bendix Corporation, South Bend, Ind., a corporation of Delaware
Filed Sept. 28, 1962, Ser. No. 226,925
3 Claims. (Cl. 230—270)

This invention relates to cooling apparatus for an automobile engine and, in particular, to an engine cooling fan driven by the engine through a fluid coupling.

Present day automobiles are usually equipped with a cooling fan which is constantly rotated by the engine at all engine speeds and which draws cooling air through a radiator to provide cooled air for the engine. It is known that such constantly operating cooling fans constitute a waste of engine power in that the cooling flow of air generated by the fan is not required at automobile speeds above a certain value when the ram air through the radiator is sufficient to provide the necessary cooling effect for the engine. For the purpose of conserving engine power as well as reducing fan wear and fan noise, it is desirable that the cooling fan be driven by the engine at relatively low automobile speeds when the flow of cooling air is generated primarily by the fan action and not driven by the engine at relatively high automobile speeds when the engine cooling effect is derived principally from the ram air passing through the radiator. Various fan drives which function to vary cooling fan speed in accordance with the engine speed or which function to disconnect the driving power to the cooling fan in the above-mentioned manner have been proposed but such proposed fan drives have not been entirely satisfactory due to complexity and attendant expense of manufacturing the component parts thereof and assembling the same, bulky and weighty nature, and necessary periodic maintenance to ensure correct operation. It is therefore an object of the present invention to provide an automobile cooling fan drive which is operative to drive the fan at relatively low automobile speeds below a predetermined speed and which is inoperative to drive the fan at automobile speeds above the predetermined speed.

It is another object of the present invention to provide a cooling fan drive which is simple in structure, inexpensive to manufacture and easily assembled, and relatively maintenance free.

An important object of the present invention is to provide a simple and reliable fluid coupling for transmitting power from an engine to an engine accessory such as a cooling fan.

It is still another object of the present invention to provide a fluid coupling for driving an automobile engine cooling fan which coupling is sensitive to engine r.p.m. and rendered inoperative at a predetermined engine r.p.m.

Other objects and advantages of the present invention will become apparent from the following description taken in conjunction with the accompanying drawings wherein:

FIGURE 1 is a sectional view taken along the diameter of the fan drive assembly; and FIGURE 2 is a sectional view taken on line 2—2 of FIGURE 1.

Referring to the drawings, numeral 10 represents a shaft suitably journaled in an engine casing, not shown, for rotation about axis a—a. For example, the shaft 10 may be an extension of a water pump shaft, not shown, which supports a water pump impeller, not shown, for rotation about the axis a—a or the shaft 10 may be an extension of an engine accessory which depends upon a rotary input motion for operation. The shaft 10 extends through a central opening 12 in a circular pulley member 14 having stamped sheet metal side portions 16 and 18 which define an annular fluid chamber 20. The side portions 16 and 18 are provided with mating annular surfaces 22 which are fixedly secured together by electric seam welding or any other suitable fastening means which provides a fluid tight joint. The radial inner portion of side portion 16 is clamped between an enlarged diameter section 24 of shaft 10 and a nut 26 threadedly engaged with shaft 10. The radial outermost portions of side portions 16 and 18 diverge to form a V-shaped recess 28 which accommodates a V-belt 30. Bearing members 32 and 34 carried on shaft 10 are provided with radially outwardly extending flange portions 36 and 38, respectively, which define the ends of a recess 40. An annular support 42 mounted in recess 40 and rotatably journaled on bearing members 32 and 34 etxends through an opening defined by axially extending flange 46 formed on side portion 18. One end of support 42 is provided with an enlarged diameter mounting surface 48 to which a fan 50 is fixedly secured by any suitable fastening means such as a plurality of circumferentially spaced bolts 52. A nut 54 threadedly engaged with the end of shaft 10 bears against a washer 56 which, in turn, urges the bearing member 34 axially into engagement with bearing membed 32 and flange portion 36 against section 24 of shaft 10 thereby securing bearing members 32 and 34 in position axially on shaft 10. A plurality of circumferentially equally spaced apart triangle-shaped driven paddle or vane members 58 extend radially outwardly from an integral annular ring which is curved to form an axially extending flange 60. The flange 60 is spot welded or otherwise suitably secured to the outer surface of support 42.

A circular axially extending sheet metal member 62 is provided with a plurality of integral driving vanes 64 which are stamped from member 62 and bent radially inwardly leaving openings 66 through which a fluid 68 contained in chamber 20 may flow between annular chambers 70 and 72 separated by member 62. The member 62 and vanes 64 are fixed in position relative to side portions 16 and 18 between which the member 62 and vanes 64 are clamped during assembly of the pulley member 14. Alternately, the member 62 and vanes 64 may be fixedly secured to the side portion 16 by means of spot welding or the like before the side portions 16 and 18 are secured together. A removable filler plug 74 threadedly engaged with side portion 16 provides for filling chamber 20 with fluid which fluid may be of a type similar to a conventional automobile automatic transmission fluid having a relatively low freezing temperature. An inspection plug 76 threadedly engaged with side portion 18 may be removed to permit filling chamber 20 with fluid to a predetermined level when the plug 76 is at its lowermost position as shown in FIGURE 1.

A fluid seal 78 contained in a recess 80 in support 42 bears against flange 46 to prevent the escape of fluid 68 outwardly from chamber 20.

It will be noted that the simple geometric forms of the various major component sections of the present invention are well suited to the use of sheet metal which may be easily stamped and bent to form and assembled quickly with a minimum of labor. For instance, the side portions 16 and 18 can be stamped to the form shown with ease through the use of simple dies. The vanes 58 and flange 60 can be blanked to form from sheet metal and the vanes subsequently twisted ninety degrees. The circular member 62 and integral vanes 64 can be blanked to form from flat sheet metal and the member 62 subsequently bent to circular form and the ends thereof spot welded together. To assemble members, the side portion 16 is first clamped between enlarged diameter portion 24 of shaft 10 and nut 26 after which bearing member 32 is slipped into place over shaft 10. The circular member 62 is then placed in position against side portion 16 and secured thereto in the aforementioned manner. The support 42 with side portion 18 loosely fitted thereon and vanes 58 with integral flange 60 welded in position on support 42 is then slipped over bearing member 32 and side portions 16 and 18 welded together as heretofore mentioned. The bearing member 34 is then inserted between shaft 10 and support 42 with washer 56 in position thereagainst and the nut 54 tightened to lock bearing members 32 and 34 in position on shaft 10. The chamber 20 may be filled through plug 74 opening with a measured volume of fluid 68 or filled to the level of inspection plug 78 opening.

At zero r.p.m. the fluid 68 will fill the lowermost portion of chamber 20 to the level indicated. When the engine, not shown, is started, the pulley member 14 and attached vanes 64 are rotated by V-belt 30 causing the fluid 68 to be agitated in the direction of rotation of vanes 64. The fluid 68 impinges against one or more of the vanes 58 causing the support 42 and attached fan 50 to rotate in the same direction as vanes 64. Assuming the vehicle to be accelerating in response to increasing engine r.p.m., the fluid 68 will be displaced radially outwardly in response to the increasing r.p.m. of pulley member 14 and attached vane 64. Since the vehicle speed is directly related to engine r.p.m. and the r.p.m. of pulley member 14 and attached vanes 64 is directly related to engine r.p.m., it follows that the r.p.m. of vanes 58 and attached fan 50 will be directly related to vehicle speed. Upon reaching a vehicle speed of approximately 25 m.p.h. the flow of ram air through the radiator, not shown, is sufficient to provide the necessary cooling effect to the engine at which time the fan 50 is no longer needed. At the vehicle speed of 25 m.p.h., the centrifugal effect upon the fluid 68 causes the fluid 68 to be distributed radially outwardly filling the annular chamber 70 and spaced between adjacent vanes 64 at which time the fluid 68 no longer impinges against vanes 58 thereby breaking the fluid connection between vanes 58 and vanes 64. As a result the vanes 58 and attached fan 50 cease to rotate as engine r.p.m. increases and thus vehicle speed increases beyond the 25 m.p.h. value. When decelerating to a vehicle speed of less than 25 m.p.h., the centrifugal effect upon fluid 68 will decrease accordingly and at a speed of 25 m.p.h. the fluid 68 will again impinge against the vanes 58 resulting in rotation of fan 50.

It will be understood that various changes and modifications in the structure shown and described may be made by those persons skilled in the art without departing from the spirit of the present invention.

I claim:
1. An engine cooling fan drive comprising:
an engine driven rotatably mounted shaft;
means defining a constant volume fluid chamber fixedly secured to said engine driven shaft and rotatable therewith;
a plurality of circumferentially arranged spaced apart axially extending vanes fixedly secured within said fluid chamber and rotatable therewith;
an annular support journaled on said shaft for relative movement thereto;
said fan being fixedly secured to a support and rotatable therewith;
a plurality of circumferentially arranged radially extending vanes fixedly secured to said support and rotatable therewith;
said fluid chamber containing a predetermined quantity of fluid which is urged rotationally by said first named vanes and which impinges against said second named vanes to thereby drive said second named vanes and fan secured thereto;
said fluid being urged radially outwardly relative to said second named vanes in response to the centrifugal force derived from rotational movement of said fluid chamber such that upon attainment of a predetermined rate of rotation of said fluid chamber, said fluid is displaced radially outwardly beyond the radial outer edges of said second named vanes thereby eliminating the driving effect of said fluid on said second named vanes.

2. An engine driven cooling fan drive comprising:
an engine driven rotatably mounted shaft;
means defining a constant volume fluid chamber fixedly secured to said engine driven shaft and rotatable therewith;
a support journaled on said shaft for relative movement thereto;
a fan fixedly secured to said support and rotatable therewith;
a plurality of circumferentially arranged spaced apart axially extending vanes fixedly secured within said chamber and rotatable therewith;
a vane fixedly secured to said support and extending radially outwardly into said chamber with a radial outermost edge closely spaced from a radial innermost edge of said first named vanes;
said fluid chamber containing a predetermined quantity of fluid which is urged rotationally by said first named vanes and which impinges against said second named vane to thereby drive said second named vane and fan secured thereto;
said fluid being displaced radially outwardly relative to said second named vane in response to the centrifugal force derived from rotational movement of said fluid chamber such that, upon attaining a predetermined rate of rotation of said fluid chamber, said fluid is displaced radially outwardly beyond the radial outer edge of said second named vane thereby eliminating the driving effect of said fluid on said second named vane.

3. An engine cooling fan drive comprising:
a shaft mounted for rotation about an axis;
a pulley member fixedly secured to said shaft and driven by the engine;
said pulley member including first and second stamped annular sheet metal side portions having radially outwardly extending axially diverging outermost end portions which cooperate to define a V-belt recess and having axially spaced radial inner portions which cooperate to define a constant volume fluid chamber;
said first and second side portions being fixedly secured together between said recess and said fluid chamber in such manner as to provide a fluid tight connection between said first and second side portions;
said first side portion having a radial innermost portion fixedly secured to said shaft;
said second side portion having a radial innermost axially extending annular flanged portion which defines a central opening;
an annular support journaled on said shaft for relative movement thereto and extending through said central opening into said fluid chamber;
a fan secured to one end of said annular support;
a plurality of circumferentially arranged spaced apart radially extending first vanes fixedly secured to the opposite end of said support and rotatable therewith in said fluid chamber;
a plurality of circumferentially arranged spaced apart axially extending second vanes secured to said first and second side portions and rotatable therewith;
said second vanes having a radial innermost edge closely spaced to a radial outermost edge of said first vanes;
said fluid chamber containing a predetermined quantity of fluid which is urged rotationally by said second vanes and which impinges against said first vanes to thereby drive said first vanes and fan secured thereto;

said fluid being urged radially outwardly relative to said first vanes in response to the centrifugal force generated by rotation of said pulley member such that, upon attainment of a predetermined rate of rotation of said fluid chamber, said fluid is displaced radially outwardly beyond the radial outermost edge of said first vanes thereby eliminating the driving effect of said fluid on said first vanes.

References Cited by the Examiner
UNITED STATES PATENTS

| | | | |
|---|---|---|---|
| 2,380,660 | 7/1945 | McKay. | |
| 2,738,048 | 3/1956 | Douglas | 192—104 |
| 3,059,745 | 10/1962 | Tauschek | 192—58 |

DAVID J. WILLIAMOWSKY, *Primary Examiner.*

ROBERT C. RIORDON, *Examiner.*